Aug. 24, 1926.
W. C. BROWN
1,597,430
VALVE CONTROLLING MECHANISM
Filed April 2, 1921    2 Sheets-Sheet 1
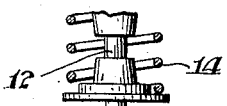
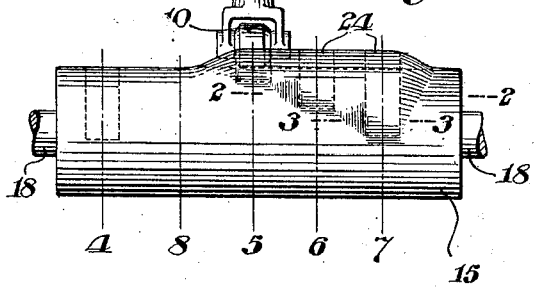
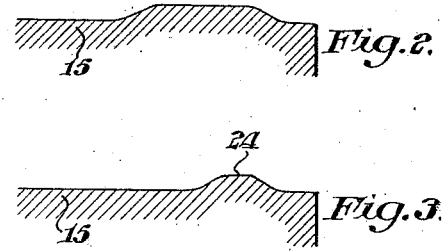
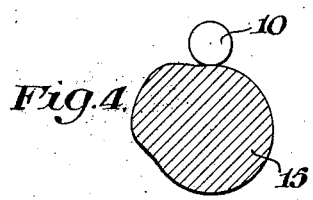
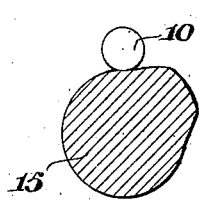
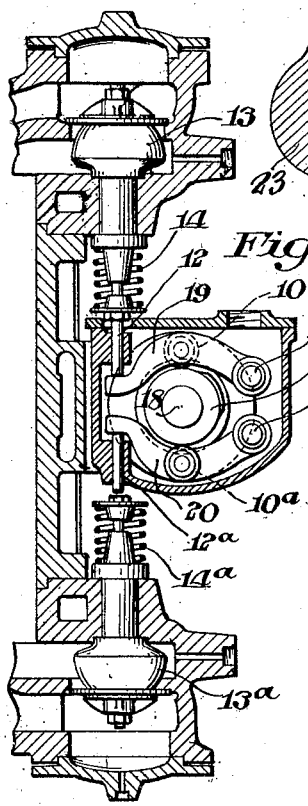
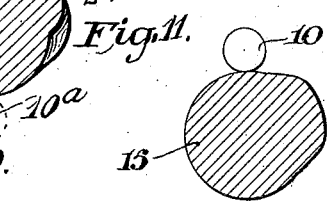
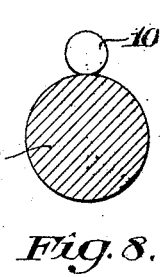
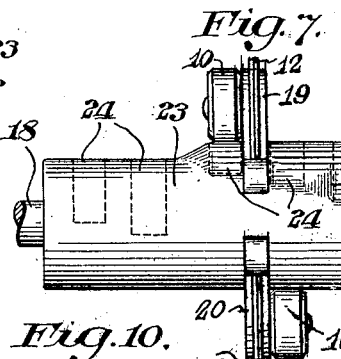
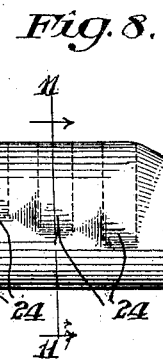
Inventor:
William Clinton Brown,
By Tho. T. Croydale
Attorney.

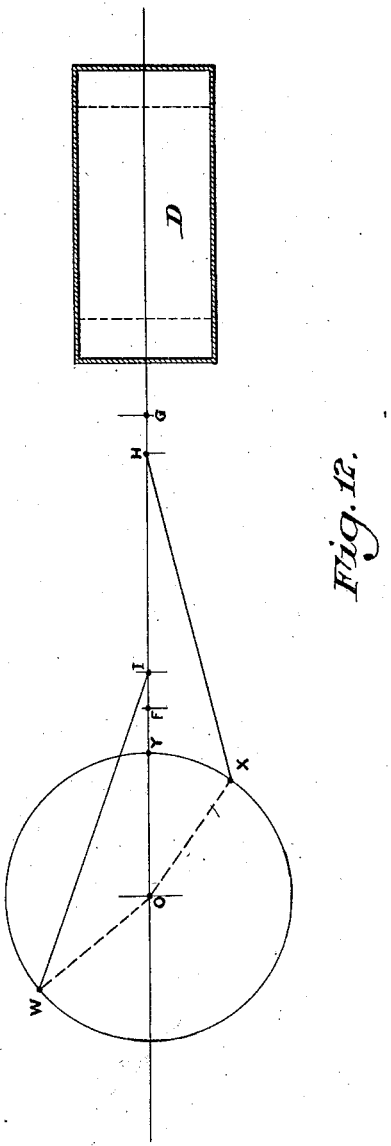

Patented Aug. 24, 1926.

1,597,430

UNITED STATES PATENT OFFICE.

WILLIAM C. BROWN, OF PRESCOTT, ONTARIO, CANADA, ASSIGNOR TO STUMPF UNAFLOW ENGINE COMPANY, INC., A CORPORATION OF NEW YORK.

VALVE-CONTROLLING MECHANISM.

Application filed April 2, 1921. Serial No. 457,837.

My invention relates to improvements in valve controlling mechanism, and is adapted to actuate valves on steam engines, for varying the length of the cut-off and for reversing the engine.

The invention is especially applicable to marine engines and other forms of reversing or maneuvering engines of the una-flow type.

One of the peculiarities of the una-flow engine, and one which permits of its great economy is the fact that it operates at very short cut-offs. When the engine is used for marine purposes it has to operate not only at short cut-offs, but at long cut-offs for maneuvering, in order that it may be in position to start at any point of its revolution, so that the una-flow marine engine requires a much greater range in cut-off than the ordinary counter-flow engine.

It has been the common practice for una-flow marine engines to have two separate and distinct valve motions, one for operating and one for maneuvering, because any known form of reversing link motion is not wide enough in its range of cut-off. If it is arranged to give sufficient cut-off to permit of maneuvering, it will not open the valve sufficiently to give economical results at the short cut-off necessary for regular operation.

I have been able to obviate this difficulty and to provide a simple form of valve motion by means of a rotating substantially cylindrical body provided with a valve actuating peripherally extending formation raised above the common peripheral or neutral surface of said body; said formation is provided with valve actuating paths of travel of different lengths for the purpose of securing different lengths of cut-offs. A properly positioned similarly raised surface is provided for reversing. The body is arranged to be shifted longitudinally to bring the different paths of travel of said elevated formation into operative relationship with the valve spindle as required.

In order to avoid the necessity of installing a mechanism to raise the valves from their seats when the body is shifted longitudinally, I have provided all spaces or surfaces, between peripheral parts differing in elevation, of a gradual inclination. These inclined intermediate portions must be extremely gradual in order to avoid dangerous strains on the parts in the shifting of said rotating body.

This application is a continuation in part of application Serial No. 163,575, filed April 21, 1917.

Referring to the drawings, which illustrate merely by way of example, suitable means for effecting the invention, Fig. 1 is a view in elevation showing a form of the invention where the roller connected directly to the valve spindle engages directly with the rotating body.

Fig. 2 is a fragmentary longitudinal section on line 2—2 of Fig. 1.

Fig. 3 is a similar section on line 3—3 of Fig. 1.

Fig. 4 is a cross-section on line 4 of Fig. 1.
Fig. 5 is a cross-section on line 5 of Fig. 1.
Fig. 6 is a cross-section on line 6 of Fig. 1.
Fig. 7 is a cross-section on line 7 of Fig. 1.
Fig. 8 is a cross-section on line 8 of Fig. 1.

Fig. 9 is a part section and part elevation on a smaller scale showing the invention applied to the steam inlet valves of a double acting cylinder.

Fig. 10 is a side elevation of a rotating member with formations and associated mechanism adapted for use in double acting cylinders.

Fig. 11 is a section on line 11, 11 of Fig. 10.

Fig. 12 is a diagram showing that the face of the cam for the head end of the revolution must be shorter than the face of the cam for the crank end of the revolution, to compensate for the angularity of the connecting rod.

Similar numerals refer to similar parts throughout the several views.

Referring to Fig. 1, the roller 10 is adjustably secured by means of the lock nuts 11 to the spindle 12 of the steam admission valve, such for example as the valve 13, shown in Fig. 9. This valve is normally held in the closed position by the spring 14 when the roller rests upon the neutral part of the rotating body 15, and is moved into the open position when the rotating body is shifted longitudinally to cause an engagement of the roller 10 with any one of the paths of travel on the peripheral formation which is raised above the common or neutral surface of said rotating body 15.

In order to secure different lengths of cut-offs and also a reversal of the engine, I have as above indicated, provided a plurality of paths of travel on said peripherally extending formation raised above the common or neutral peripheral surface of said body; said paths of travel being of different lengths corresponding to the length of cut-off required. These different length raised formations or paths are shown in the sectional views 4 to 7 inclusive. Between these raised or elevated paths and the neutral portion (indicated in Fig. 8) of the rotating body, in fact between all adjacent parts of unequal elevation, I have provided intermediate portions of extremely gradual inclination, in order that the rotating body may be shifted longitudinally without causing dangerous strains on the cooperating parts, or in other words to facilitate the longitudinal shifting of the rotating body 15, no matter what its rotative position may be with respect to the point of engagement of the roller 10. This roller 10 also is preferably made with a bevelled or curved tread as shown.

The dotted lines in Figs. 1 and 10 are merely meant to indicate, diagrammatically, the several paths of travel of the roller upon the raised peripheral surfaces of the rotating body.

The formation shown in section in Fig. 8 indicates the neutral periphery of the rotating body; that is, being in a true circle, when the roller 10 engages this part of the body, there is no actuation of the valve. The cross-section shown in Fig. 4 indicates the formation and relative position of the raised portion that causes the reverse movement of the engine. The cross-sections shown in Figs. 5, 6 and 7 indicate the formations giving paths of travel for different lengths of cut-off.

The rotating body 15 is mounted on a suitable shaft 18 adapted to rotate synchronously with the engine, and is also adapted to be shifted in any desirable way either automatically or arbitrarily.

In the structure shown in Figs. 9 and 10, which illustrates the arrangement of valves for a double acting cylinder, the valve spindles 12 and 12ª project against the free ends of levers 19 and 20, pivotally mounted at 21 and 22. On these levers are mounted the rollers 10 and 10ª, which are held in engagement with the opposite sides of the rotating body 23, by the action of the springs 14 and 14ª through the respective valve spindles 12 and 12ª. It will be understood that if the same peripheral actuating formations were used, with double acting engines, for both valves, we would get a difference in the steam distribution between the two strokes, due to the angularity of the connecting rod. In order to compensate for this difference, due to the angularity of the connecting rod, that is to get an even distribution, I have provided the rotating body 23, as shown in Fig. 10, having a plurality of pairs of peripheral paths 24. One path of each pair is adapted to actuate one valve, and the other path of each pair is adapted to actuate the other valve. One path of each pair is modified as to its length, relatively to the other path of the pair, to compensate, in its valve actuation for the normal difference in steam distribution due to the angularity of the connecting rod.

Fig. 12 is a diagram, with assumed equal cut-offs at the head and crank ends, showing that the face of the cam for the head end of the revolution will have to be considerably shorter than the face of the cam for the crank end of the revolution.

In this diagram D represents the cylinder, E the circular path of the crank pin, F the position of the cross-head pin at the end of the outstroke, G the position of the cross-head pin at the end of the instroke, H and I, the positions of the cross-head pin at points of cut-off respectively. In order to have equal cut-offs, the distance between F, I and H, G must be equal. I—W, and H—X represent the connecting rod in the positions of equal cut-offs at different ends of the stroke. It will be seen from this that when the piston is at the crank end, the valve will be open while the crank travels through the arc Z W, and when the piston is at the head end, the valve will be open while crank travels through the arc Y X, the angle Z O W, being considerably greater than the angle Y O X. As the cam shaft revolves with the main shaft and has the same angular speed, the lifting face of the cam at the crank end of the revolution would be equivalent to the arc Z W, and the lifting face at the head end of the revolution would be equal to the arc Y X. As the arc Z W is considerably longer than the arc Y X, the face of the cam for the crank end of the revolution would have to be considerably longer than the face of the cam for the head end of the revolution, therefore we use two cams, one of which has a lifting face longer than the other.

These several pairs of raised paths 24, are arranged side by side as indicated in Fig. 10. Of course it will be understood that the rollers 10 and 10ª are offset one from the other, so that one roller will track with one path of a pair of raised paths 24, when the other roller tracks with the other path of the same pair.

In operation the member 23 is shifted longitudinally a distance equal to the width of a pair of said paths, so that one of each pair shall actuate one valve, as for example valve 13, through roller 10, while the other shall actuate the other valve 13ª, as through roller 10ª.

In a similar way as above described, I have provided between all adjacent peripheral parts of unequal elevation, intermediate surfaces of extremely gradual inclination.

As a matter of actual construction I have found it convenient to have the actual active actuating surfaces or paths slightly separated, to allow greater space to secure a sufficiently gradual inclination between surfaces of different elevation, so that these surfaces shall, as it were, blend together and afford a minimum of resistance to the cooperating parts, in shifting said body, no matter what its rotative position or whether the engine is running or not.

What I claim is:—

Valve controlling mechanism comprising a rotating body having a series of cams of different lengths for different cut-offs for the same end of the cylinder, and of different lengths for the same cut-off for opposite ends of the cylinder to compensate for the angularity of the connecting rod.

WILLIAM C. BROWN.